(12) United States Patent
Nikola

(10) Patent No.: US 11,244,656 B2
(45) Date of Patent: *Feb. 8, 2022

(54) USE OF A DISPLAY OF A CONVERTER, METHOD FOR OPERATING A CONVERTER, AND CONVERTER

(71) Applicant: SEW-EURODRIVE GMBH & CO. KG, Bruchsal (DE)

(72) Inventor: Joachim Nikola, Kraichtal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/190,065

(22) Filed: Mar. 2, 2021

(65) Prior Publication Data

US 2021/0183339 A1    Jun. 17, 2021

Related U.S. Application Data

(63) Continuation of application No. 15/321,020, filed as application No. PCT/EP2015/001410 on Jul. 9, 2015, now Pat. No. 10,943,565.

(30) Foreign Application Priority Data

Jul. 29, 2014    (DE) .......................... 102014010979.8

(51) Int. Cl.
*G09G 5/22*    (2006.01)
*G05B 19/10*    (2006.01)
(Continued)

(52) U.S. Cl.
CPC ............ *G09G 5/22* (2013.01); *G05B 19/0423* (2013.01); *G05B 19/108* (2013.01); *G06F 3/02* (2013.01);
(Continued)

(58) Field of Classification Search
CPC ........ G09G 5/22; G09G 3/04; G05B 19/0423; G05B 19/108; G05B 2219/21071;
(Continued)

(56) References Cited

U.S. PATENT DOCUMENTS 4,867,152 A    9/1989  Kou et al.
5,363,290 A    11/1994 Doup et al.
(Continued)

FOREIGN PATENT DOCUMENTS

CN    101296523 A    10/2008
CN    10245550 A     7/2012
(Continued)

OTHER PUBLICATIONS

English Language Machine Translation of JP-10333715A (Year: 1998).*

(Continued)

*Primary Examiner* — Jason M Mandeville
(74) *Attorney, Agent, or Firm* — Carter Deluca & Farrell LLP

(57)    ABSTRACT

In the use of a display of a converter, method for operating a converter, and converter, the converter having an address code switch, in particular on its housing, and in an actuation of the address code switch and during a subsequent, predefined period of time, a respective value corresponding to the respective switch position of the address code switch is displayed by the display. Operating information of the converter is displayed in all other cases.

20 Claims, 2 Drawing Sheets

(51) Int. Cl.
*G06F 3/02* (2006.01)
*G05B 19/042* (2006.01)
*G06F 3/0484* (2013.01)
*G06F 3/0362* (2013.01)
*G09G 3/04* (2006.01)

(52) U.S. Cl.
CPC ........ *G06F 3/0362* (2013.01); *G06F 3/04847* (2013.01); *G09G 3/04* (2013.01); *G05B 2219/21071* (2013.01); *G05B 2219/23128* (2013.01); *G05B 2219/23132* (2013.01); *G05B 2219/23382* (2013.01)

(58) Field of Classification Search
CPC ........... G05B 2219/23132; G05B 2219/23128; G05B 2219/23382; G06F 3/02; G06F 3/0362; G06F 3/04847
USPC ......... 345/184, 214, 33, 34, 76, 87; 715/700
See application file for complete search history.

(56) References Cited

U.S. PATENT DOCUMENTS 8,793,417 B2 7/2014 Bollmeyer et al.
10,943,565 B2 * 3/2021 Nikola .................. G06F 3/0362
2017/0118857 A1 4/2017 Nikola

FOREIGN PATENT DOCUMENTS

| | | |
|---|---|---|
| CN | 103699074 A | 4/2014 |
| DE | 102008036380 A1 | 2/2010 |
| DE | 102010055337 A1 | 7/2012 |
| EP | 1079287 A1 | 2/2001 |
| EP | 1847891 A1 | 10/2007 |
| JP | H10333715 A | 12/1998 |
| JP | 2007299205 A | 11/2007 |
| JP | 2008-193600 A | 8/2008 |
| KR | 10-2014-0086323 A | 7/2014 |

OTHER PUBLICATIONS

International Preliminary Report on Patentability, dated Mar. 13, 2018, in corresponding International Application No. PCT/EP2015/001410. (English-language translation).

International Search Report, dated Nov. 19, 2015, in corresponding International Application No. PCT/EP2015/001410. (English-language translation).

* cited by examiner

US 11,244,656 B2

USE OF A DISPLAY OF A CONVERTER, METHOD FOR OPERATING A CONVERTER, AND CONVERTER

CROSS-REFERENCE TO RELATED APPLICATIONS

The present application is a continuation of U.S. patent application Ser. No. 15/321,020, which is the national stage of PCT/EP2015/001410, having an international filing date of Jul. 9, 2015, and claims priority to Application No. 10 2014 010 979.8, filed in the Federal Republic of Germany on Jul. 29, 2014, each of which is expressly incorporated herein in its entirety by reference thereto.

FIELD OF THE INVENTION

The present invention relates to a use of a display of a converter, a method for operating a converter, and a converter.

BACKGROUND INFORMATION

It is generally conventional for a converter to include a display for displaying an operating status.

SUMMARY

Therefore, example embodiments of the present invention is directed to avoiding faults in the operation of industrial systems.

Among features of example embodiments of the present invention in the use of a display of a converter are that the converter has an address code switch, in particular on its housing, and that when the address code switch is actuated and following a subsequent, predefined period of time, a respective value corresponding to a respective switch position of the address code switch is displayed by the display, and that operating information of the converter is displayed in all other cases.

This has the advantage that when setting the address, a display used for other purposes, in particular a 7-segment display, may be utilized for displaying the address, thus making it possible to reduce faults. In particular, not only may the direct labeling of the address code switch at a small type size be used, but also the much larger display of the display. The type size of the display may be twice as large as the labeling of the address code switch on the housing of the address code switch. This ensures reliable readability, and thus reduces the fault rate.

The time period may have a value between 1 second and 100 seconds. This is considered advantageous insofar as after the actuation of the address code switch, the address value input with the aid of the address code switch is displayed for the period of time, so that the operator receives optical feedback of his input. The operator is therefore able to check his input within an adequate period of time.

The operating information may include a status, especially an operating status, e.g., the type of control method of the converter, enable information or a fault status, in particular. This is considered advantageous in that operating information is displayed when no address is input. Only when an address is input will the input address be visualized for a period of time.

The address code switch may have a rotary switch, in particular a rotary switch having discrete rotary positions and/or address code rotary switches, or a DIP switch, the address code switch having a finite number of switch positions, in particular. This has the advantage that in a digital display, in particular such as a 7-segment display, the finite number can then be displayed in an uncomplicated manner. The display is particularly simple if each rotary switch of the address code switch has only 16 or fewer switch positions. The switch position of the respective rotary switch is thus representable by a 7-segment display in each case, in particular hexadecimally.

A hexadecimal number may be allocated to each switch position of the address code switch, and the switch position may be correspondingly labeled on the address code switch. This has the advantage that the operator can view the labeling on the one hand and the display on the other. The fault rate is therefore able to be reduced further. In addition, an item of information regarding the address allocated to the converter during the initial startup operation is also displayed during a normal operation due to the fact that it can be read out on the address code switch itself.

The address code switch may have labeled surface sections, and a respective labeled surface section may be assigned to each switch position of the address code switch. This has the advantage of allowing a simple readout, which also remains in a power outage.

The information displayed by the display in an actuation of the address code switch and during a subsequent predefined period of time may correspond to the labeling assigned to the corresponding switch position, in particular the allocated labeled surface section. This is considered advantageous insofar as a redundant display of information is provided and as a result, the fault rate is reduced.

Among features of the method for operating a converter are that the converter has an address code switch, in particular on its housing, and a display. The actuation of the address code switch is detected, and a respective value corresponding to the respective current switch position of the address code switch is displayed by the display temporally after the detection instant for a subsequent, predefinable period of time.

Operating information of the converter is displayed in all other cases.

This has the advantage that on account of the redundant display, the type size of the display being greater than the type size of the labeling of the address code switch.

Among features of the alternative method for operating a converter are that the converter has an address code switch, in particular on its housing, and a display. The actuation of the address code switch is detected, and following each detected actuation, a value corresponding to the respective switch position of the address code switch is displayed by the display for a subsequent, predefined period of time.

Different operating information of the converter is displayed in all other cases, that is to say, values or information not related to the switch position, in particular.

This is considered advantageous inasmuch as no further display is required, since the existing display may be used for displaying the address information for the duration of the time period.

Among features of the converter are that the converter has an address code switch, in particular on its housing, and a display.

The converter includes a device for detecting an actuation of the address code switch, and a device for the time delay after a respective detected actuation, in particular for a subsequent predefined period of time.

The device for the delay time generates an enable signal, which: (a) in an enablement, controls an actuator actuating the display such that it actuates the display so that a respective value corresponding to the respective switch position of the address code switch is displayed by the display; and (b) in the absence of an enablement, the enable signal controls the actuator such that it controls the display so that other operating information of the converter is displayed, that is to say, values or information not related to the switch position, in particular.

This is considered advantageous in that the actuation is detectable with the aid of a sensor, i.e. a device for detecting the actuation of the address code switch. The sensor preferably detects an electric variable that depends on the switch position, such as a current or voltage.

Example embodiments of the present invention are described in greater detail with reference to the Figures.

DETAILED DESCRIPTION

Figure 1:
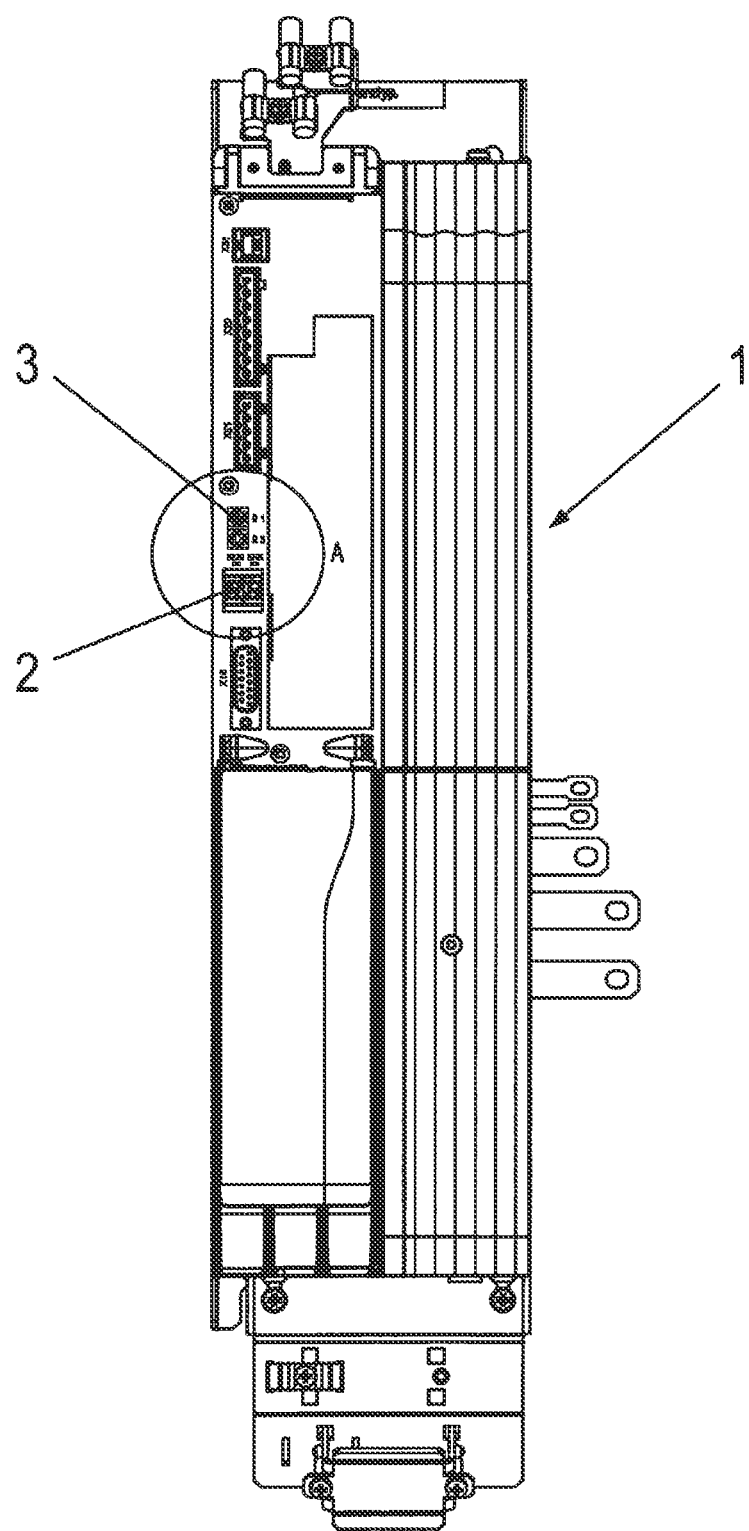
FIG. 1 shows a field device according to an example embodiment of the present invention in a frontal view.
Figure 2:
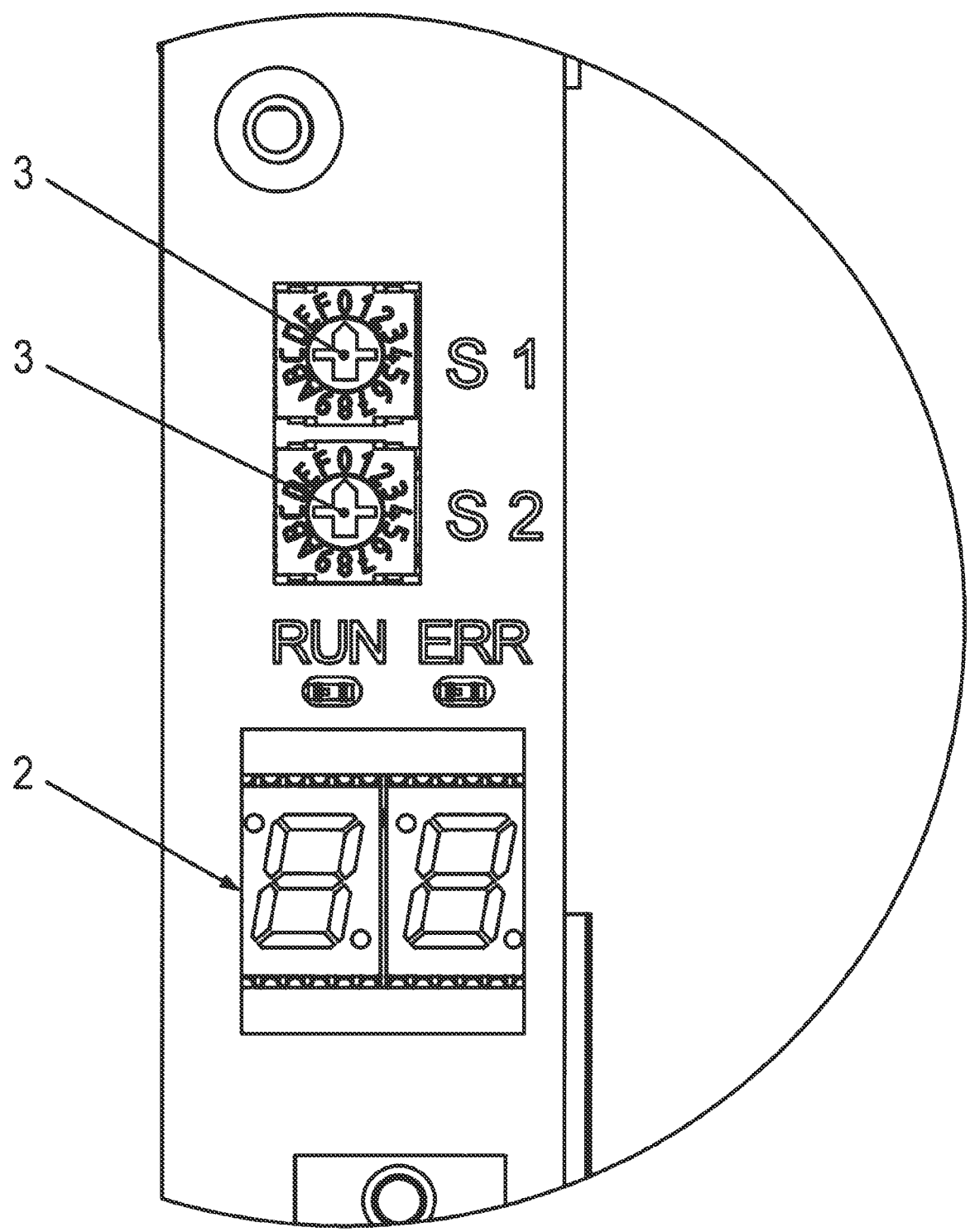
FIG. 2 shows an enlarged cut-away section of the example embodiment shown in FIG. 1.

Field device 1 is arranged as a bus device of a data bus. For this purpose, an address, i.e. a device address, is assigned to field device 1 during the start-up operation.

This allows a higher-level control, preferably a master, to transmit data to field device 1. The address is added to each transmitted data packet, so that field device 1 receives the data and other field devices that are also possibly connected to the data bus as bus devices disregard the data packet. The data packet, for example, includes command data and/or other data.

The inputting of the address on field device 1 is accomplished with the aid of address code switches, which are arranged as address code rotary switches 3. This means that the address is codable by turning, i.e. adjusting the rotary position. In the exemplary embodiment illustrated, 16 rotary positions are possible. However, since two such address code switches 3 are used, addresses between 0 and 255 are able to be set.

Although address code switch 3 is labeled so that each rotary position is assigned a corresponding value, the labeling is implemented at a type size whose numbers or letters are smaller than the diameter of the rotatable part of address code switch 3.

Field device 1 also has a display 2. In the exemplary embodiment illustrated, it is provided by two 7-segment displays.

During an operation, display 2 is used for the display of operating information, such as the status of the converter.

The operating type or a fault status of the converter, for instance, is shown.

During the start-up operation, especially when setting the address, no operating information of the converter is displayed, but instead, the switch position of the address code switches is shown.

The switch position of the first address code switch 3 is digitally displayed in the first one of the two 7-segment displays. In the same manner, the switch position of second address code switch 3 is displayed with the aid of the second one of the two 7-segment displays.

Following a certain period of time, the 7-segment displays are once again used for the display of the operating information.

The actuation, or in other words, the modification of the position of address code switch 3, may detected. As soon as the actuation has been detected, the 7-segment display will then be used to display the address information, i.e. the position of the address code switch. Once the actuation has been concluded, the display of the address information will continue to be maintained for a predefined period of time, whereupon a switch to the display of the operating information takes place.

Therefore, during the setting of the address information and during a subsequent, predefined period of time, display 2 is used for the display of the input address information and then for the display of the operating information.

Even in the case of an address change that takes place after the startup operation, i.e. an actuation of address code switch 3, the display 2 will once again be used to display the address information assigned to the switch position for the time period of the actuation and a subsequent period of time.

Preferably, a hexadecimal number is able to be displayed by each one of the 7-segment displays, thereby utilizing the 7-segment display in an optimal manner. 256 different addresses are thus able to be displayed by the two hexadecimal numbers.

In a further exemplary embodiment of the present invention, address code switches other than address code rotary switches 3 are employed. DIP switches may preferably be used for this purpose. These too have labeling on each switch. When the respective DIP switch is actuated, the information that corresponds to the respective switch position will be displayed.

LIST OF REFERENCE NUMERALS

1 Field device, e.g., a converter
2 Display, e.g., a 7-segment display
3 Address code rotary switch

What is claimed is:

1. A method of using a display of a converter, the converter including an address code switch adapted to set a device address of the converter, comprising:
    displaying, on the display, during a predefined time period after setting and/or changing the device address of the converter based on a switch position of the address code switch, a value corresponding to the switch position of the address code switch and to the device address of the converter; and
    displaying on the display in all other cases operating information of the converter.

2. The method according to claim 1, wherein the device address of the converter is set based on the switch position of the address code switch during a start-up operation of the converter.

3. The method according to claim 1, wherein the address code switch includes a plurality of address code switches and the display includes a plurality of displays, each display corresponding to a respective one of the address code switches.

4. The method according to claim 1, wherein the display includes a 7-segment display adapted to display a hexadecimal number corresponding to the device address.

5. The method according to claim 1, wherein the address code switch and/or the display is provided on a housing of the converter.

6. The method according to claim 1, wherein the period is between 1 second and 100 seconds.

7. The method according to claim 1, wherein the operating information includes a status, an operating status, a type of control method of the converter, enable information, and/or a fault status.

8. The method according to claim 1, wherein the address code switch includes a rotary switch, includes a rotary switch having discrete rotary positions and/or address code rotary switches, includes a DIP switch, and/or has a finite number of switch positions.

9. The method according to claim 1, wherein each switch position of the address code switch is assigned a hexadecimal number, and the switch is labeled accordingly on the address code switch.

10. The method according to claim 1, wherein the address code switch includes labeled surface sections, and each switch position of the address code switch is assigned a respective labeled surface section.

11. The method according to claim 1, wherein information displayed on the display in an actuation of the address code switch and during a subsequent, predefined period of time corresponds to labeling assigned to a respective switch position and/or an allocated labeled surface section.

12. The method according to claim 1, wherein the setting and/or changing of the device address including actuating the address code switch.

13. The method according to claim 1, wherein the setting and/or changing of the device address includes modification of the switch position of the address code switch.

14. The method according to claim 1, further comprising detecting an actuation of the address code switch, the displaying of the value corresponding to the switch position of the address code switch and to the device address of the converter being performed in respond to the detection of the actuation of the address code switch.

15. The method according to claim 1, wherein the value corresponding to the switch position of the address code switch and to the device address of the converter is displayed temporarily in response to detection of actuation of the address code switch.

16. The method according to claim 1, wherein the operating information of the converter includes values and/or information not related to the switch position.

17. The method according to claim 12, further comprising detecting the actuation of the address code switch.

18. The method according to claim 17, wherein the actuation of the address code switch is detected by a sensor.

19. The method according to claim 17, wherein the actuation of the address code switch is detected by detecting an electric variable that depends on the switch position.

20. The method according to claim 19, wherein the electric variable includes current and/or voltage.

* * * * *